US010524484B2

(12) United States Patent
Klingshirn et al.

(10) Patent No.: US 10,524,484 B2
(45) Date of Patent: Jan. 7, 2020

(54) REFRIGERATION APPLIANCE WHICH SUPPORTS THE CURING PROCESS OF REFRIGERATED GOODS, IN PARTICULAR OF MEAT

(71) Applicant: BSH HAUSGERAETE GMBH, Munich (DE)

(72) Inventors: Astrid Klingshirn, Zusmarshausen (DE); Bernd Schessl, Dillingen (DE)

(73) Assignee: BSH Hausgeraete GmbH, Munich (DE)

( * ) Notice: Subject to any disclaimer, the term of this patent is extended or adjusted under 35 U.S.C. 154(b) by 396 days.

(21) Appl. No.: 15/026,407

(22) PCT Filed: Oct. 1, 2014

(86) PCT No.: PCT/EP2014/071070
§ 371 (c)(1),
(2) Date: Mar. 31, 2016

(87) PCT Pub. No.: WO2015/049303
PCT Pub. Date: Apr. 9, 2015

(65) Prior Publication Data
US 2016/0242427 A1 Aug. 25, 2016

(30) Foreign Application Priority Data
Oct. 2, 2013 (DE) .................. 10 2013 220 089

(51) Int. Cl.
*F25D 17/04* (2006.01)
*F25D 17/06* (2006.01)
(Continued)

(52) U.S. Cl.
CPC ............ *A23B 4/068* (2013.01); *F25D 17/042* (2013.01); *F25D 17/06* (2013.01); *F25D 17/065* (2013.01);
(Continued)

(58) Field of Classification Search
CPC ........ F25D 17/06; F25D 29/00; F25D 17/042; F25D 2317/04111; F25D 2317/0413; F25D 17/065; A23V 2002/00; A23B 4/068
See application file for complete search history.

(56) References Cited

U.S. PATENT DOCUMENTS 2,650,882 A 9/1953 Sperti
2,962,875 A * 12/1960 Barroero ............... A47F 3/0452
62/256

(Continued)

FOREIGN PATENT DOCUMENTS

CN 1423973 A 6/2003
CN 102374750 A 3/2012
(Continued)

*Primary Examiner* — Ana M Vazquez
(74) *Attorney, Agent, or Firm* — Laurence A. Greenberg; Werner H. Stemer; Ralph E. Locher

(57) ABSTRACT

A refrigeration appliance includes a storage area for refrigerated goods and a control facility or unit for controlling a storage climate in the storage area by using storage climate parameters. One storage climate parameter is a temperature in the storage area. Another storage climate parameter relates to an air speed in the storage area. The refrigeration appliance is used in particular for the dry curing of meat.

16 Claims, 3 Drawing Sheets

(51) Int. Cl.
*A23B 4/06* (2006.01)
*F25D 29/00* (2006.01)

(52) U.S. Cl.
CPC .......... *F25D 29/00* (2013.01); *A23V 2002/00* (2013.01); *F25D 2317/041* (2013.01); *F25D 2317/0417* (2013.01); *F25D 2317/04111* (2013.01); *F25D 2317/04131* (2013.01)

(56) References Cited

U.S. PATENT DOCUMENTS

| | | | |
|---|---|---|---|
| 3,241,334 A | | 3/1966 | Amore |
| 3,377,941 A | | 4/1968 | Jaremus |
| 6,506,108 B1 | * | 1/2003 | Jagusch ............... A22C 15/005 452/193 |
| 8,191,382 B2 | * | 6/2012 | Lim ..................... F25D 11/022 62/441 |
| 9,273,897 B2 | | 3/2016 | Lee et al. |
| 2008/0302253 A1 | * | 12/2008 | Salvaro .................. F24C 15/00 99/325 |
| 2010/0083687 A1 | | 4/2010 | Handa et al. |
| 2012/0042664 A1 | | 2/2012 | Lee et al. |
| 2012/0291469 A1 | * | 11/2012 | Li ........................... F25D 29/00 62/186 |

FOREIGN PATENT DOCUMENTS

| | | |
|---|---|---|
| EP | 2172725 A1 | 4/2010 |
| EP | 2420786 A2 | 2/2012 |
| FR | 1094179 A | 5/1955 |
| JP | 2002188882 A | 7/2002 |

* cited by examiner

REFRIGERATION APPLIANCE WHICH SUPPORTS THE CURING PROCESS OF REFRIGERATED GOODS, IN PARTICULAR OF MEAT

BACKGROUND OF THE INVENTION

Field of the Invention

The present invention relates to a refrigeration appliance having a storage area for refrigerated goods, in particular for meat.

BRIEF SUMMARY OF THE INVENTION

It is the object of the invention to specify a refrigeration appliance, in which an aging process is assisted for specific items, for example meat.

This object is achieved by the subject matter and the method having the features as claimed in the respective independent claim. Advantageous embodiments of the invention are set out in the figures, the description and the dependent claims.

According to one aspect of the invention the object is achieved by a refrigeration appliance having a storage area for refrigerated goods, in which the refrigeration appliance has a control facility for controlling a storage climate in the storage area by means of storage climate parameters, wherein a storage climate parameter comprises a temperature in the storage area and a storage climate parameter relates to an air speed in the storage area. The refrigeration appliance has the technical advantage for example that a storage climate can be set for treating the refrigerated goods for a specific purpose.

A refrigeration appliance refers in particular to a domestic refrigeration appliance, in other words a refrigeration appliance used for domestic management in a domestic context or in the catering field, serving in particular to store food and/or beverages at specific temperatures, for example a refrigerator, a freezer cabinet, a combined refrigerator/freezer, a chest freezer or a wine chiller cabinet.

In one advantageous embodiment of the refrigeration appliance a storage climate parameter comprises a relative air humidity in the storage area. This has the technical advantage for example that it is possible to bring about or prevent drying of the refrigerated goods as required.

In a further advantageous embodiment of the refrigeration appliance the control facility has storage climate types with assigned storage climate parameter sets. This has the technical advantage for example that storage climate types with assigned storage climate parameter sets can be predefined or already prepared.

In a further advantageous embodiment of the refrigeration appliance the control facility has the storage climate types drying, aging and storage. This has the technical advantage for example that storage climate parameter sets assigned to such predefined or already prepared storage climate types can be supplied and stored in a control unit.

In a further advantageous embodiment of the refrigeration appliance the control facility is embodied to activate storage climate types one after the other in climate phases each with a predefined duration. This has the technical advantage for example that a treatment of the refrigerated goods can be set up with a specific storage climate type for a predefined duration and at the end of this time period a switch can be made to a different storage climate type.

In a further advantageous embodiment of the refrigeration appliance the refrigeration appliance has a ventilation facility and a storage climate parameter relating to the air speed in the storage area comprises conditions for switching the ventilation facility on and off. This has the technical advantage for example that a storage climate type can be assigned conditions for air flows, which are independent of compressor operation or compressor downtime.

In a further advantageous embodiment of the refrigeration appliance a storage climate type features sustained operation of the ventilation facility. This has the technical advantage for example that rehumidification of the storage compartment can take place during compressor downtime.

In a further advantageous embodiment of the refrigeration appliance the refrigeration appliance has a storage area suitable for controlling a storage climate in the storage area by means of storage climate parameters and a further storage area separate therefrom with a conventional refrigeration area controller. This has the technical advantage for example that the refrigeration appliance can have a storage area for treating specific refrigerated goods with a specific storage climate and a further storage area for conventional refrigerated goods, for example a conventional refrigeration area. The further storage area is advantageously located above the storage area in the refrigeration appliance.

According to a further aspect of the invention the object is achieved by a method for aging food, in particular meat, in a refrigeration appliance with a storage area for refrigerated goods, wherein a storage climate parameter comprises a temperature in the storage area, having the following method steps setting a storage climate of a storage climate type aging for aging food for a first climate phase with a first duration, wherein a storage climate parameter relates to an air speed in the storage area; and setting a storage climate of a storage climate type storage for storing food for a second climate phase, wherein the storage climate type aging has a higher temperature than the storage climate type storage. The method has the technical advantage for example that the aging of food can be set up for a predefined duration and at the end of this time period a switch can be made to the storage climate type storage.

It is thus possible to age food to the desired degree for consumption quickly under optimized conditions and then store it again under optimized conditions to maintain its freshness for a long period. The second climate phase for storage is generally not for a predefined duration but is based on the consumption of the food or according to when a user selects a different climate phase.

In one advantageous embodiment the method features the additional preceding method step of setting a storage climate of a storage climate type drying for drying food for a predefined third duration, wherein the storage climate type drying has a lower relative air humidity than the storage climate type storage. This has the technical advantage for example that the food can be dried under optimized conditions before it is aged.

It is thus possible to treat raw meat in an automated manner in situ in a number of climate phases in a domestic context or in catering without having to utilize the highly technical production means of the food industry. In a first climate phase the meat is dried for a predefined time period with a dry protective layer forming on the surface; then in a second climate phase the meat is aged, again under optimized conditions for a predefined time, then in a third climate phase the meat, which is now dried ready for consumption, is stored again under optimized conditions so that its freshness is maintained for a long period.

According to a further advantageous embodiment the refrigeration appliance comprises a temperature setting facility for setting a temperature in the storage area between −0.5 and 4° C. and a ventilation facility for generating an air flow with an air speed of at least 0.5 m/s, preferably between 0.5 m/s and 2.5 m/s in the storage area. The temperature in the storage area is preferably between 0.5° C. and 1.5° C. The refrigeration appliance has the technical advantage for example that the aging process of meat is assisted in the storage area.

In a further advantageous embodiment of the refrigeration appliance a temperature setting facility is provided for setting a temperature in the storage area of at least −1° C. for the storage climate type drying.

In a further advantageous embodiment of the refrigeration appliance a temperature setting facility is provided for setting a temperature in the storage area of maximum +4° C. for the storage climate type drying.

In a further advantageous embodiment of the refrigeration appliance a temperature setting facility is provided for setting a target temperature of 0° C. in the storage area for the storage climate type drying.

In a further advantageous embodiment of the refrigeration appliance a temperature setting facility is provided for setting a temperature of at least +2° C. in the storage area for the storage climate type aging.

In a further advantageous embodiment of the refrigeration appliance a temperature setting facility is provided for setting a temperature of maximum +4° C. in the storage area for the storage climate type aging.

In a further advantageous embodiment of the refrigeration appliance a temperature setting facility is provided for setting a temperature in the storage area with a target temperature of 12° C. or 14° C. for specific foods, in particular salami and raw ham, for the storage climate type aging.

In a further advantageous embodiment of the refrigeration appliance a temperature setting facility is provided for setting a temperature in the storage area with a maximum temperature of 12° C., 14° C. or 16° C. for specific foods, in particular salami, raw ham or cheese, for the storage climate type aging.

In a further advantageous embodiment of the refrigeration appliance a temperature setting facility is provided for setting a temperature in the storage area with a minimum temperature of 8° C. for specific foods, in particular cheese, for the storage climate type aging.

In a further advantageous embodiment of the refrigeration appliance a temperature setting facility is provided for setting a temperature in the storage area with a maximum temperature of 0° C. or below this around 0° C. for the storage climate type storage.

In one advantageous embodiment of the refrigeration appliance the refrigeration appliance is configured to set a relative air humidity between 50% and 85% in the storage area. The refrigeration appliance is preferably configured to set a relative air humidity between 75% and 85% in the storage area. This has the technical advantage for example of further improving the aging process for meat in the storage area.

In a further advantageous embodiment of the refrigeration appliance the refrigeration appliance comprises an air humidity setting facility with a humidity sensor for setting a relative air humidity between 50% and 85% in the storage area. This has the technical advantage for example that active humidification and dehumidification of the storage area can take place when a limit value is exceeded.

In a further advantageous embodiment of the refrigeration appliance a humidity setting facility is provided for setting a humidity in the storage area with a very high humidity level, in particular >85% rh for specific foods, in particular cheese, for the storage climate type aging.

In a further advantageous embodiment of the refrigeration appliance provision is made for a climate phase duration of several days or several weeks.

In a further advantageous embodiment of the refrigeration appliance the refrigerated goods can be protected from ultraviolet radiation in the storage area. This has the technical advantage for example that color change reactions in the meat are avoided.

In a further advantageous embodiment of the refrigeration appliance the refrigeration appliance comprises a filter for cleaning the air in the storage area. This has the technical advantage for example that particles and impurities are removed from the air flow.

In a further advantageous embodiment of the refrigeration appliance the refrigeration appliance comprises an air disinfection facility for disinfecting the air in the storage area. This has the technical advantage for example germs cannot be transferred to to the refrigerated goods by the air.

In a further advantageous embodiment of the refrigeration appliance the refrigeration appliance comprises a control facility for controlling the temperature, the air speed and/or the relative air humidity as a function of the refrigerated goods in the storage area. This has the technical advantage for example that a refrigeration program with individual storage climate parameters tailored specifically for the refrigerated goods can be performed.

In a further advantageous embodiment of the refrigeration appliance the control facility comprises an input facility for manually inputting data relating to the refrigerated goods. This has the technical advantage for example that the refrigeration program can be selected automatically based on information provided by a user relating to the refrigerated goods.

In a further advantageous embodiment of the refrigeration appliance the control facility is configured to control the temperature, the air speed and/or the air humidity as a function of the input data. This has the technical advantage for example that the individual storage climate parameters can be adjusted individually.

In a further advantageous embodiment of the refrigeration appliance the inputtable data comprises a type of animal, the weight of a piece and the size of a piece, a desired degree of aging and/or a desired consumption date. This has the technical advantage for example that a refrigeration program can be adjusted particularly precisely.

In a further advantageous embodiment of the refrigeration appliance the refrigeration appliance comprises a setting facility for manually setting the temperature, the air speed and/or the relative air humidity in the storage area. This has the technical advantage for example that a user can select the storage climate parameters independently.

In a further advantageous embodiment of the refrigeration appliance the storage area comprises a perforated shelf surface. This has the technical advantage for example that moisture can drip down off the refrigerated goods.

In a further advantageous embodiment of the refrigeration appliance the shelf surface is made of stainless steel. This has the technical advantage for example that the shelf surface is easy to clean and hygienic.

In a further advantageous embodiment of the refrigeration appliance the storage area comprises one or more hooks for securing pieces of meat. This has the technical advantage for example that meat can be hung in the storage area and pressure points are not formed.

In a further advantageous embodiment of the refrigeration appliance the storage area is arranged in a refrigeration compartment. This has the technical advantage for example that the storage climate parameters can be set and maintained easily and with little energy outlay.

In a further advantageous embodiment of the refrigeration appliance the refrigeration appliance has two storage areas suitable for controlling a storage climate in the storage area by means of storage climate parameters and a further storage area separate therefrom with a conventional refrigeration area controller. Each of the two storage areas is assigned a separate ventilation facility. This has the technical advantage for example that a single refrigeration appliance can comprise a first storage area for treating specific refrigerated goods with a specific first storage climate, for example drying, a second storage area for treating specific refrigerated goods with a specific second storage climate, for example aging, and a further storage area for conventional refrigerated goods, for example a conventional refrigeration area.

Alternatively separate drying and ageing processes can be performed independently of one another in a single refrigeration appliance for two different stores of refrigerated goods and refrigerated goods that have already been aged ready for consumption can be kept fresh in the further storage area.

In a further advantageous embodiment of the refrigeration appliance increased or additional ventilation is provided in the storage area in the lower region of the refrigerated goods.

In a further advantageous embodiment of the refrigeration appliance a temporally predefined profile is provided for the rotational speed of the ventilation facility within a climate phase, in particular a higher rotational speed than average for the climate phase at the start of the climate phase.

In a further advantageous embodiment of the refrigeration appliance humidity control is provided by way of compressor operation and fan control or just by means of fan control.

BRIEF DESCRIPTION OF THE SEVERAL VIEWS OF THE DRAWING

Exemplary embodiments of the invention are illustrated in the drawings and are described in more detail below. In the drawings.

DESCRIPTION OF THE INVENTION

Figure 1:
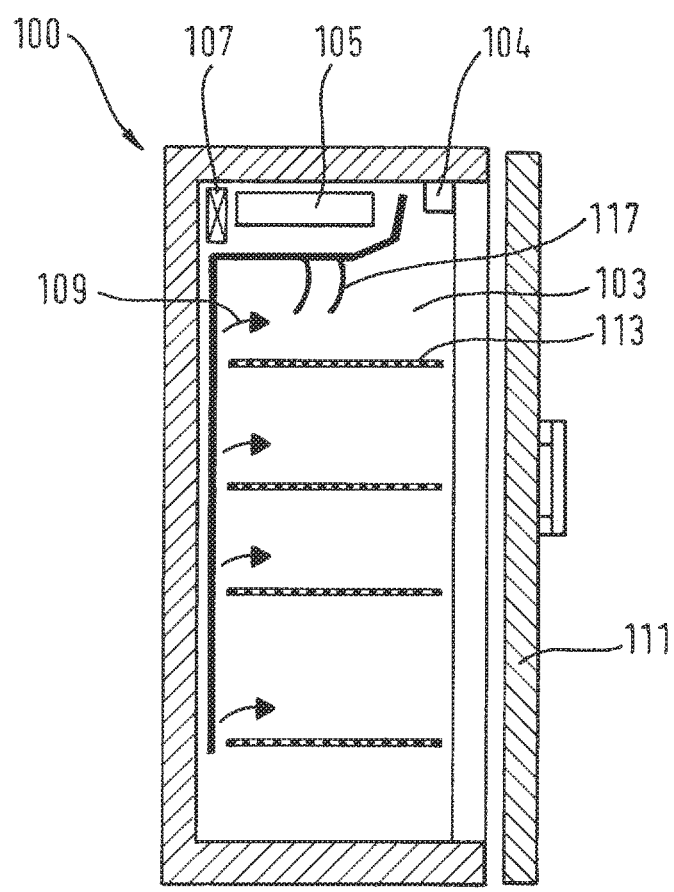
FIG. 1 shows a schematic view of a refrigeration appliance according to the invention.

The figures show different refrigeration appliances according to the invention, in which identical features or those of identical function have the same reference characters but are not necessarily described again.

FIG. 1 shows a refrigeration appliance 100 in the form of a refrigerator with a refrigeration appliance door 111. The refrigerator serves for example to refrigerate food and comprises a refrigerant circuit with an evaporator 105 or a number of evaporator units, a compressor, a condenser and a throttle device. The evaporator is a heat exchanger, in which after expansion the liquid refrigerant is evaporated as a result of absorbing heat from the medium to be cooled, in other words the air in the interior of the refrigerator.

The compressor is a mechanically operated part, which takes refrigerant vapor in from the evaporator and outputs it at a higher pressure to the condenser. The condenser is a heat exchanger, in which after compression the evaporated refrigerant is condensed as a result of emitting heat to an external cooling medium, in other words the ambient air. The throttle device is an apparatus for continuously reducing pressure by narrowing cross section.

The refrigerant is a fluid used to transmit heat in the refrigerating system, absorbing heat when the fluid is at low temperatures and low pressure and emitting heat when the fluid is at a higher temperature and higher pressure, with state changes of the fluid generally being included.

In the refrigeration appliance 100 climate conditions are created which allow the specific post-aging of meat, in particular beef, in a domestic context. After slaughter meat undergoes an aging process to establish and specifically influence its consumption quality. Meat ages in two aging phases.

In the first aging phase a process takes place within the cells, generally taking approx. 36 to 40 hours for cattle and 6 to 8 hours for pigs in standard refrigeration conditions between 0° C. and 4° C. In this process glycogen reserves in the muscles are broken down without oxygen and lactic acid formed. The pH value of the meat drops from 7.2 to 5.5. If the glycogen is consumed, the muscle fibers crosslink and the meat becomes hard and tough.

In the second aging phase proteolytically induced morphological changes produce a change in the myofibrils and therefore the desired tender consistency. During aging there is a slight rise in the pH value. The water binding capacity increases so less juice runs out during meat preparation. The aging phase lasts approx. 14 days for beef, 7 days for veal and approx. 60 hours for pork at temperatures around 3° C.

The hanging of meat on the bone, in halves or pieces is referred to as dry aging. Dry aging is a slow aging process with high water loss of up to 30% and an aging period of up to 4 weeks. Wet aging refers to the aging of meat without air in a vacuum bag. Anaerobic meat aging is brought about by the lactic acid bacteria present in the meat. It can be supplemented by parchment aging, in which meat is wrapped in parchment before the vacuum is applied so any meat juices that come out are not in sustained contact with the meat. Dry bags or aging bags are semi-permeable membrane bags used for aging. Here oxygen reaches the meat, juice drips can be conducted away and weight loss is reduced. With aqua aging meat is aged in mineral water with a high calcium, magnesium and hydrogen carbonate content. Aging can also take place in beef tallow.

The refrigeration appliance 100 allows meat to be aged and pieces of meat to undergo post-aging according to the dry aging or wet aging method or in an aging bag in a domestic context. The aging or post-aging of the meat here can take place either in the refrigeration compartment as a whole as the storage area 103 or in separate storage areas 103.

A separate storage area 103 for refrigerated goods in the form of meat has for example an additional temperature control by means of a temperature setting facility 104 with a temperature sensor for setting a temperature in the storage area 103. The storage area 103 also comprises a humidity control by means of an air humidity setting facility for setting a relative air humidity. A ventilation facility 107, for example a fanwheel, serves to generate an air flow 109 with a predefined air speed in the storage area 103.

Arranged in the storage area is a perforated shelf surface 113 which is made of stainless steel for example. The storage area 103 can also have one or more hooks 117 for securing meat pieces.

In order to assist the aging or post-aging process, the following storage climate parameters are advantageously maintained in the storage area 103:

A target temperature range for post-aging is between 0.5° C. and 1.5° C. A target range for relative air humidity is between 75% and 85%. Air humidity here can be controlled passively, for example coupled with temperature regulation and fan operating times, or actively, for example using an air humidity setting facility with a humidity sensor in the storage area to humidify or dehumidify when a predefined limit value is exceeded. The target range for air speed in the storage area 103 is between 0.5 m/s and 2.5 m/s for fast drying off and to prevent mold forming on the meat. Air speeds higher than 2.5 m/s are suitable for drying.

The exclusion of ultraviolet light (UV light) during product aging avoids color change reactions. In order to avoid the transfer of odors and germs during the aging process, air cleaning can take place, for example by means of UV disinfection, by means of a microfilter, an active carbon filter, an ionizer or a photocatalyst. This improves the air quality in the storage area.

For regulation, control or program selection of the aging function a user can set the target temperature in the storage area directly by way of an appliance electronic system or a separate electronic system on the storage compartment. An aging program can be selected by way of a separate or supplemented appliance electronic system, in which the storage climate parameters are adjusted for example according to the type of animal, the weight and size of a piece, a desired degree of aging or a desired consumption date.

Storage systems for ensuring adequate and homogeneous ventilation of the goods to be post-aged can be formed by a perforated shelf surface 113 made of stainless steel for example. Also permanently secured or flexibly mounted hooks can be provided to secure larger pieces in the storage area.

The refrigeration appliance 100 can be used for simple product storage with the claim of maintaining quality to product refinement and therefore further quality improvement for refrigerated goods. The meat aged in the refrigeration appliance 100 has a greater water binding capacity, cooks faster and remains juicy and develops a more marked aroma. The refrigeration appliance 100 allows individualized meat aging and makes domestic refrigeration appliances more professional, for example by meeting gourmet needs. Consumption quality improves during the post-aging time in the storage area 103 and an individual consumption date can be freely selected. This allows greater flexibility by further decoupling purchase and consumption.

The refrigeration appliance 100 illustrated is a no-frost refrigeration appliance, with the ventilation facility 107 bringing about all air movement.

Figure 2:
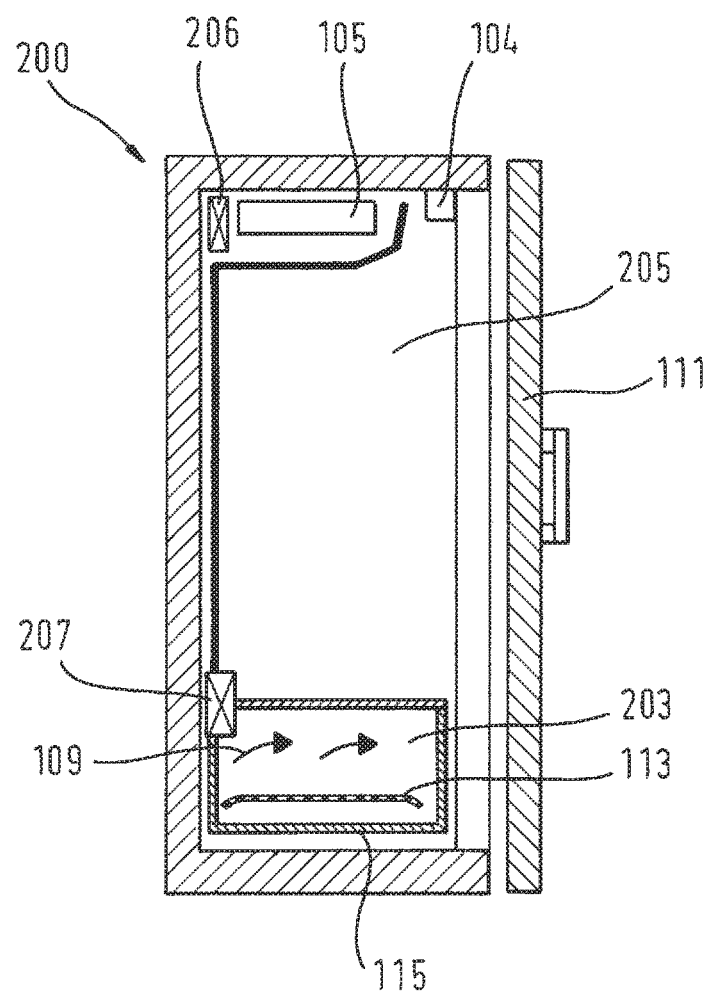
FIG. 2 shows a schematic view of a further refrigeration appliance according to the invention.

FIG. 2 shows a schematic view of a further refrigeration appliance 200. In addition to the storage area 203, which is suitable for controlling a storage climate in the storage area 103 by means of storage climate parameters, the refrigeration appliance 200 also has a further storage area 205 separate therefrom with a conventional refrigeration area controller. The refrigeration appliance 200 therefore has a further storage area 205 for conventional refrigerated goods, which is also suitable for meat aged ready for consumption, and a storage area 203 for treating specific refrigerated goods with a specific storage climate. The storage area 203 is configured as a refrigeration compartment 115 which is separated and insulated from the further storage area 205 and has a perforated shelf surface 113.

The refrigeration appliance 200 has a fan 206 for air circulation between the storage areas 203 and 205 and the evaporator 105. The refrigeration appliance 200 also has a separate ventilation facility 207 for the refrigeration compartment 115 or the storage area 203, which generates an air flow 109 with an air speed in the storage area 103 between 0.5 m/s and 2.5 m/s. The drying and aging processes are performed in a dynamically chilled refrigeration compartment 115 with fin evaporator.

Because the storage climate can be controlled, at the end of the aging process in the storage area 203 the storage climate type storage can be selected and the refrigerated goods, in particular dry-aged meat, can remain in the storage area 203. The refrigeration appliance 200 also allows the refrigerated goods to be moved out of the storage area 203 at the end of the aging process into the further storage area 205 in the same refrigeration appliance, whereupon the storage area 203 is available for new unaged refrigerated goods.

Figure 3:
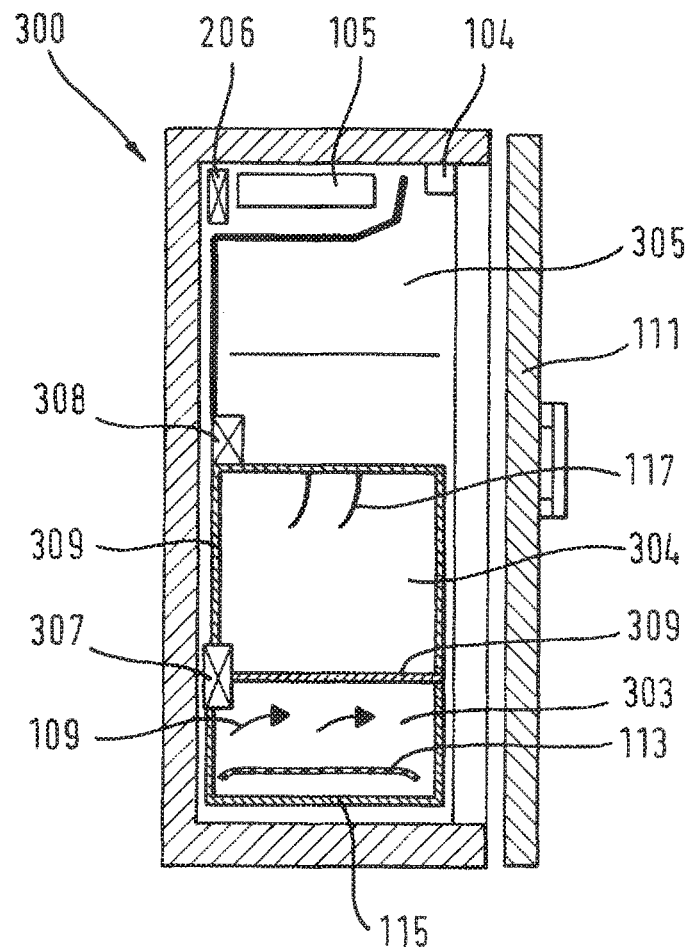
FIG. 3 shows a schematic view of a further refrigeration appliance according to the invention.

FIG. 3 shows a schematic view of a further refrigeration appliance 300. The refrigeration appliance 300 has two storage areas 303, 304, which are suitable in each instance for controlling a storage climate in the storage area 303, 304 by means of storage climate parameters. The refrigeration appliance 300 also has a further storage area 305 separate therefrom with a conventional refrigeration area controller.

A separate ventilation facility 307, 308 is assigned to each of the storage areas 303, 304. The two 303, 304 are insulated thermally from one another and from the further storage area 305 by means of insulating walls 309.

In the refrigeration appliance 300 for example the storage area 303 can be used for treating specific refrigerated goods with a specific first storage climate, for example drying, the storage area 304 can be used for treating specific refrigerated goods with a specific second storage climate, for example aging, and the further storage area 305 can be used for conventional refrigerated goods, for example for a conventional refrigeration area.

Alternatively separate drying and aging processes can be performed independently of one another in a single refrigeration appliance for two different stores of refrigerated goods in the storage areas 303, 304 and refrigerated goods that have already been aged ready for consumption can also be kept fresh in the further storage area 305.

Figure 4:
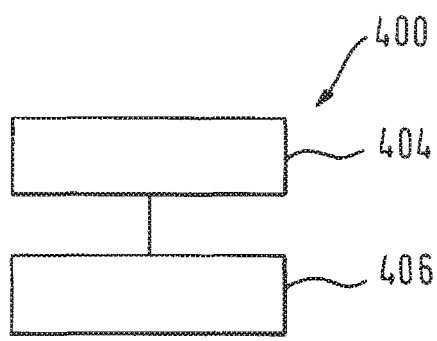
FIG. 4 shows a flow diagram of a method according to the invention.

FIG. 4 shows a flow diagram 400 of a method according to the invention. The method for aging food, in particular meat, is performed in a refrigeration appliance with a storage area for refrigerated goods, with a storage climate parameter comprising a temperature in the storage area. The method starts with the method step of setting 404 a storage climate of a storage climate type aging for aging food for a first climate phase with a first duration. A storage climate parameter here relates to an air speed in the storage area. This is followed by the method step of setting 406 a storage climate of a storage climate type storage for storing food for a second climate phase. The storage climate type aging here has a higher temperature than the storage climate type storage.

Figure 5:
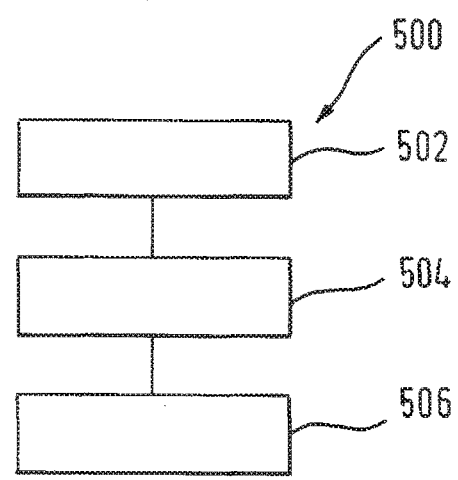
FIG. 5 shows a flow diagram of a further method according to the invention

FIG. 5 shows a flow diagram 500 of a method according to the invention. The method for aging food, in particular meat, is performed in a refrigeration appliance with a storage area for refrigerated goods, with a storage climate parameter comprising a temperature in the storage area. The method starts with the method step 502 of setting a storage climate of a storage climate type drying for drying food for a third climate phase with a predefined third duration. The storage climate type drying here has a lower relative air humidity than the storage climate type storage.

This is followed by the method step of setting 504 a storage climate of a storage climate type aging for aging food for a first climate phase with a first duration. A storage climate parameter here relates to an air speed in the storage area.

This is followed by the method step of setting 506 a storage climate of a storage climate type storage for storing food for a second climate phase. The storage climate type aging here has a higher temperature than the storage climate type storage. The second climate phase for storage is for a second duration which is generally not predefined but is based on the consumption of the food or according to when a user selects a different climate phase.

Although the invention has been illustrated in conjunction with dynamic evaporators, it can also be implemented with static evaporators.

All the features described and illustrated in conjunction with individual embodiments of the invention can be provided in different combinations in the inventive subject matter in order to achieve their advantageous effects at the same time.

The scope of protection of the present invention is defined by the s and is not restricted by the features described in the description or illustrated in the figures.

LIST OF REFERENCE CHARACTERS

100 Refrigeration appliance
103 Storage area
104 Temperature setting facility
105 Evaporator
107 Ventilation facility
109 Air flow
111 Refrigeration appliance door
113 Shelf surface
115 Refrigeration compartment
117 Hook
200 Refrigeration appliance
203 Storage area
205 Further storage area
206 Fan
207 Ventilation facility
300 Refrigeration appliance
303, 304 Storage area
305 Further storage area
307, 308 Ventilation facility
309 Insulating wall

The invention claimed is:

1. A refrigeration appliance, comprising:
a storage area for refrigerated goods; and
a controller for controlling a storage climate in said storage area by using storage climate parameters;
one of said storage climate parameters being a temperature parameter in said storage area;
another of said storage climate parameters an air speed parameter in said storage area;
said controller having storage climate types with assigned storage climate parameter sets defining said temperature parameter and said air speed parameter, said storage climate types of said controller are drying, aging and storage; and
a further storage area with a conventional refrigeration area controller, said further storage area being separate from said storage area having a further storage climate controlled by using further storage climate parameters.

2. The refrigeration appliance according to claim 1, wherein a further of said storage climate parameters is a relative air humidity parameter in said storage area, said relative air humidity parameter being a parameter of said assigned storage climate parameter sets.

3. The refrigeration appliance according to claim 1, wherein said controller is configured to activate storage climate types one after another in climate phases each with a predefined duration.

4. The refrigeration appliance according to claim 1, which further comprises a ventilator, said storage climate parameter relating to said air speed in said storage area including conditions for switching said ventilator on and off.

5. The refrigeration appliance according to claim 4, wherein said controller has storage climate types with assigned storage climate parameter sets, and one of said storage climate types includes continuous operation of said ventilator.

6. The refrigeration appliance according to claim 1, wherein said controller includes a temperature setter for setting a temperature in said storage area between −0.5 and 4° C. and a ventilator for generating an air flow with an air speed of at least 0.5 m/s in said storage area.

7. The refrigeration appliance according to claim 1, wherein said controller is configured to set a relative air humidity between 50% and 85% in said storage area.

8. The refrigeration appliance according to claim 1, which further comprises an air humidity setter with a humidity sensor for setting a relative air humidity between 50% and 85% in said storage area.

9. The refrigeration appliance according to claim 1, wherein said controller includes an input for manually inputting data relating to refrigerated goods.

10. The refrigeration appliance according to claim 9, wherein said controller is configured to control at least one of the temperature, the air speed or the air humidity as a function of said input data.

11. The refrigeration appliance according to claim 9, wherein said input data include at least one of a type of animal, a weight of a piece, a size of a piece, a desired degree of aging or a desired consumption date.

12. The refrigeration appliance according to claim 1, which further comprises a setter for manually setting at least one of temperature, air speed or relative air humidity in said storage area.

13. The refrigeration appliance according to claim 1, wherein said storage area includes a perforated shelf surface.

14. The refrigeration appliance according to claim 1, wherein said storage area includes a hook for securing pieces of meat.

15. A method for aging food or aging meat in a refrigeration appliance having a storage area for refrigerated goods with a storage climate parameter including a temperature in the storage area, the method comprising the following steps:
providing a refrigeration appliance according to claim 1;

a) setting a storage climate of a storage climate type relating to aging for aging food for a first climate phase with a predefined first duration, the storage climate parameter relating to an air speed in the storage area; and b) setting a storage climate of a storage climate type relating to storage for storing food for a second climate phase; and c) setting the storage climate type relating to aging to a higher temperature than the storage climate type relating storage.

16. The method according to claim 15, which further comprises:

setting an additional preceding storage climate of a storage climate type relating to drying for drying food for a third climate phase with a predefined third duration; and setting a lower relative air humidity for the storage climate type relating to drying than for the storage climate type relating to storage.

* * * * *